(12) United States Patent
Hur et al.

(10) Patent No.: US 9,475,410 B2
(45) Date of Patent: Oct. 25, 2016

(54) RECLINER FOR MOTOR VEHICLE HAVING WEDGE

(71) Applicant: KM&I. CO., LTD., Incheon (KR)

(72) Inventors: Chang Bum Hur, Incheon (KR); Byung Su Kim, Bucheon-si (KR); Kyung Shin Jeong, Incheon (KR)

(73) Assignee: KM&I. CO., LTD. (KR)

( * ) Notice: Subject to any disclaimer, the term of this patent is extended or adjusted under 35 U.S.C. 154(b) by 140 days.

(21) Appl. No.: 14/317,260

(22) Filed: Jun. 27, 2014

(65) Prior Publication Data

US 2015/0008715 A1 Jan. 8, 2015

(30) Foreign Application Priority Data

Jul. 2, 2013 (KR) ......................... 10-2013-0077391

(51) Int. Cl.
*B60N 2/235* (2006.01)

(52) U.S. Cl.
CPC ............ *B60N 2/2356* (2013.01); *B60N 2/236* (2015.04)

(58) Field of Classification Search
CPC ............................. B60N 2/2356; B60N 2/236
USPC ............................................ 297/367 P, 367 L
See application file for complete search history.

(56) References Cited

U.S. PATENT DOCUMENTS

| | | | | |
|---|---|---|---|---|
| 8,042,872 | B2* | 10/2011 | Kim | B60N 2/2356 297/367 L |
| 8,602,498 | B2* | 12/2013 | Yamada | B60N 2/2356 297/367 L |
| 8,998,330 | B2* | 4/2015 | Ito | B60N 2/2356 297/367 L |
| 2006/0055222 | A1 | 3/2006 | Bonk et al. | |

FOREIGN PATENT DOCUMENTS

| | | |
|---|---|---|
| JP | 2002101999 | 4/2002 |
| JP | 2004249091 | 9/2004 |
| JP | 2005230300 | 9/2005 |
| KR | 100397888 | 9/2003 |

\* cited by examiner

*Primary Examiner* — Milton Nelson, Jr.
(74) *Attorney, Agent, or Firm* — Cantor Colburn LLP

(57) ABSTRACT

A recliner for a vehicle having a wedge comprises: an upper gear having an internal tooth formed on an inner peripheral edge thereof and connected to a seat back to control an inclination angle of the seat back by rotation; lock gear parts provided with an external tooth engaged with the internal tooth and locking or unlocking a rotation of the upper gear by a reciprocating motion; a holder having the upper gear and the lock gear parts received therein and guiding the reciprocating motion of the lock gear parts; and a cam received in the holder and controlling the reciprocating motion of the lock gear parts by rotation. The lock gear part is configured of a first lock gear and a wedge gear part.

17 Claims, 20 Drawing Sheets

RECLINER FOR MOTOR VEHICLE HAVING WEDGE

CROSS-REFERENCE TO RELATED APPLICATIONS

This application claims priority under 35 U.S.C. §119 to Korean Patent Application No. 10-2013-0077391, filed on Jul. 2, 2013, in the Korean Intellectual Property Office, the disclosure of which is incorporated herein by reference in its entirety.

TECHNICAL FIELD

The following disclosure relates to a recliner for a motor vehicle having a wedge capable of controlling an inclination angle of a back of a vehicle seat, and more particularly, to a recliner for a vehicle having a wedge capable of improving clearance and strength of the recliner.

BACKGROUND

Generally, a vehicle seat is configured of a seat cushion and a seat back to maintain an on-board posture of a passenger and is classified into a separator type seat which is formed at a driver's seat and a passenger's seat to enable only one person to be seated and a bench type seat which is formed at a back of the driver's seat and the passenger's seat to enable several persons to be simultaneously seated.

The separator type seat which is formed at the driver's seat and the passenger's seat may control a vehicle seat to meet a driver's body type and a passenger's body type so as to enable the driver to maintain a posture suitable for driving, in which a seat back serving as a back to enable the passenger to have a rest is provided with a reclining apparatus controlling an angle back and forth.

The separator type seat separately manufactured from a seat is configured to freely control an angle of a back by operating a recliner formed therebetween to allow a driver or a passenger to be stably and conveniently seated in the state in which he/she appropriately may control the position and back of the seat according to his own body type.

FIG. 1 is plan view of a recliner 10 for a general vehicle and FIG. 2 is a partially enlarged view of the recliner 10. As illustrated, the recliner 10 is configured of an upper gear 1 having an internal tooth formed on an inner peripheral surface thereof and connected to a seat back to control an inclination angle of the seat back by rotation, a lock gear 2 provided with an external tooth engaged with the internal tooth and locking or unlocking a rotation of the upper gear 1 by a linear reciprocating motion, a holder 3 provided with a guide surface 3a to guide the linear reciprocating motion of the lock gear 2, a cam 4 controlling the linear reciprocating motion of the lock gear 2 by rotation, and an elastic member 5 applying an elastic force to the cam 4.

The recliner 10 having the above configuration is configured so that the lock gear 2 is linearly reciprocated according to a restriction condition of the cam 4 to control the inclination of the seat back to a passenger desired position and the external tooth is engaged with the internal tooth formed at the upper gear 1 to fix the upper gear 1 at a desired position. In this case, since the lock gear 2 moves along the guide surface 3a, a gap G (see FIG. 2) is required between the lock gear 2 and the guide surface 3a and when the gap G is increased according to an accumulation of machining tolerance of the lock gear 2 and the holder 3, the motion of the holder 3 is large in the state in which the lock gear 2 is engaged with the upper gear 1 and thus clearance is generated and the seat back vibrates and thus passenger's comfort is degraded.

However, the gap G may not be removed due to the accumulation of the machining tolerance of parts of the lock gear 2 and the holder 3. In particular, to smooth the linear reciprocating motion of the lock gear 2, the gap G needs to be formed. Therefore, the clearance factor of the recliner 10 due to the gap G always exists.

Therefore, a technology to ensure the strength of the recliner by preventing the seat back from vibrating by offsetting the clearance generated by the gap G and keeping the stable engagement of the upper gear 1 with the lock gear 2 depending on a front or back external force load direction of the seat back is required.

SUMMARY

An embodiment of the present invention is directed to providing a recliner for a vehicle having a wedge capable of stably engaging a lock gear with an upper gear and offsetting a clearance generated by a gap between the lock gear and a holder by applying a wedge structure to the lock gear.

Another embodiment of the present invention is directed to providing a recliner for a vehicle capable of reinforcing an engagement strength of a lock gear and an upper gear depending on a front or back external force of a seat back by additionally including a front protrusion and a back protrusion which are adjacently formed to a main protrusion in addition to the main protrusion of a cam fixing the lock gear.

In one general aspect, a recliner for a vehicle having a wedge includes: an upper gear having an internal tooth formed on an inner peripheral edge thereof and connected to a seat back to control an inclination angle of the seat back by rotation, lock gear parts provided with an external tooth engaged with the internal tooth and locking or unlocking a rotation of the upper gear by a reciprocating motion, a holder having the upper gear and the lock gear parts received therein and guiding the reciprocating motion of the lock gear parts, and a cam received in the holder controlling the reciprocating motion of the lock gear parts by rotation, wherein the lock gear part may be configured of a first lock gear and a wedge gear part and the wedge gear part may include a second lock gear having one end provided with an external tooth and the other end provided with a lock protrusion and a wedge having one end provided with the wedge groove contacting the lock protrusion and the other end contacted with the cam.

The other end of the lock protrusion and one end of the wedge groove may have a width narrowing toward a central axis of the recliner.

The wedge gear part may surface-contact a lock protruding surface provided at the other end of the lock protrusion and a wedge groove surface provided at one end of the wedge groove.

The second lock gear may be to be bilaterally symmetric based on a first reference line which connects an inner peripheral edge of the upper gear to a central axis of the recliner, the lock protruding surface may be configured to have a predetermined inclination angle to a second reference line orthogonal to the first reference line, and the wedge groove surface may be configured to have a predetermined inclination angle to the second reference line to correspond to the lock protruding surface.

The lock protruding surface and the wedge groove surface may be formed to be inclined toward an outside of the recliner.

The wedge gear part may be one or plural selected from the plurality of lock gear parts.

The recliner may further include: an elastic lever applying elasticity to the cam in a direction in which the lock gear part is engaged with the upper gear, wherein the elastic lever may be radially provided in the holder as many as the number of lock gear parts.

The plurality of lock gear parts may be radially disposed in the holder and the elastic lever may be disposed between lock gear parts adjacent to the lock gear parts.

The cam may include: a first protrusion contacting the other end of the lock gear part; and second and third protrusions formed at both sides in a circumferential direction of the first protrusion and contacting the other ends of the lock gear parts.

When any one of the first, second, and third protrusions contacts the other end of the lock gear part, the other of the second and third protrusions may be spaced apart from the other end of the lock gear part.

The recliner may further include: a driving protrusion protruding in an axial direction of the recliner and formed on one surface or the other surface of the lock gear part; and a guide plate rotating by interlocking the cam and provided with a driving groove into which the driving protrusion is inserted to reciprocate the lock gear part by the rotation.

The driving protrusion formed in the wedge gear part may be formed on one surface or the other surface of the second lock gear.

The holder may be protrudedly provided with a guide part of which the guide surfaces are formed at both sides in a circumferential direction of the recliner so as to guide a linear reciprocating motion of the lock gear part, both sides in the circumferential direction of the lock gear part may be provided with slide surface sliding on and contacting the guide surfaces, and one side of the slide surface may be provided with a stepped part depressed inwardly in the circumferential direction of the recliner.

The stepped part may be formed on the second lock gear.

The stepped part may be configured of an inclined surface formed to be inclined inwardly in the circumferential direction of the recliner from one side of the slide surface and a stepped surface extending in one direction from the one side of the inclined surface.

The holder may have an upper surface protrudedly provided upwardly with a guide part of which the guide surfaces are formed at both sides in a circumferential direction of the recliner so as to guide a linear reciprocating motion of the lock gear part, the upper surface of the guide part may be provided with a cylindrical holder protrusion protruding upwardly, and the upper gear may be further provided with a rotating guide part depressed upwardly from a lower surface of the upper gear to have an inner peripheral edge contacting an outer peripheral edge of the holder protrusion.

The holder protrusion may be formed in one or plural in each of the plurality of guide parts.

The plurality of holder protrusions may be each disposed at an equal interval along the circumferential direction of the recliner.

The plurality of holder protrusions may be each disposed at an equal distance from a rotating central axis of the recliner.

Other features and aspects will be apparent from the following detailed description, the drawings, and the claims.

[Detailed Description of Main Elements]

| | |
|---|---|
| 1000, 2000: Recliner | |
| 100: Upper gear | 110: Internal tooth |
| 120: Rotating guide part | |
| 150: Upper gear hole | |
| 200, 300: Lock gear part | |
| 200: First lock gear | 210: External tooth |
| 231: First lock protrusion | 232: Second lock protrusion |
| 233: Third lock protrusion | 240: First slide surface |
| 260: First driving protrusion | |
| 300: Wedge gear part | 310: Second lock gear |
| 311: Lock protrusion | 312: Lock protruding surface |
| 320: Wedge | 321: Lock groove |
| 322: Lock groove surface | 331: First wedge protrusion |
| 332: Second wedge protrusion | 333: Third wedge protrusion |
| 340: Second slide surface | 350: Third slide surface |
| 360: Second driving protrusion | 370: Wedge slide surface |
| 400: Holder | 410: Main receiving space |
| 420: Guide space | 421: Guide surface |
| 430: Wedge guide groove | 431: Wedge guide surface |
| 440: Elastic lever space | |
| 500: Cam | 510: First protrusion |
| 520: Second protrusion | 530: Third protrusion |
| 550: Cam hole | |
| 600: Elastic lever | |

| [Detailed Description of Main Elements] | |
|---|---|
| 700: Guide plate | 710: Driving slide hole |
| 750: Guide plate hole | |
| 800: Shaft | |
| 900: Housing | |
| 950: Cap | |
| 3410: Inclined surface | 3420: Stepped surface |
| 4500: Guide part | 4510: Holder protrusion |

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments will be described in detail with reference to the accompanying drawings.

Figure 1:
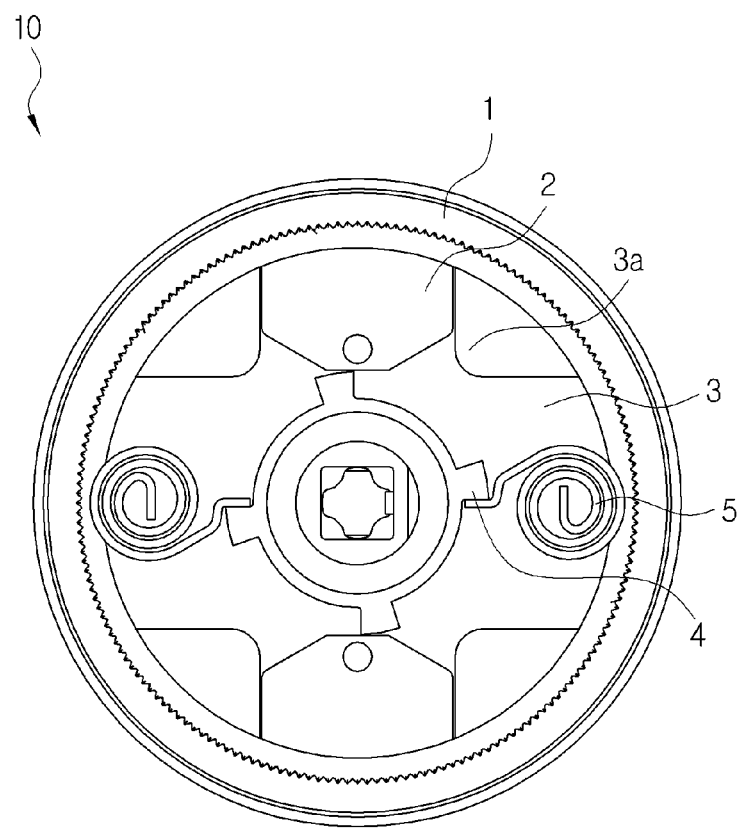
FIG. 1 is a plan view of a general recliner for a vehicle.
Figure 2:
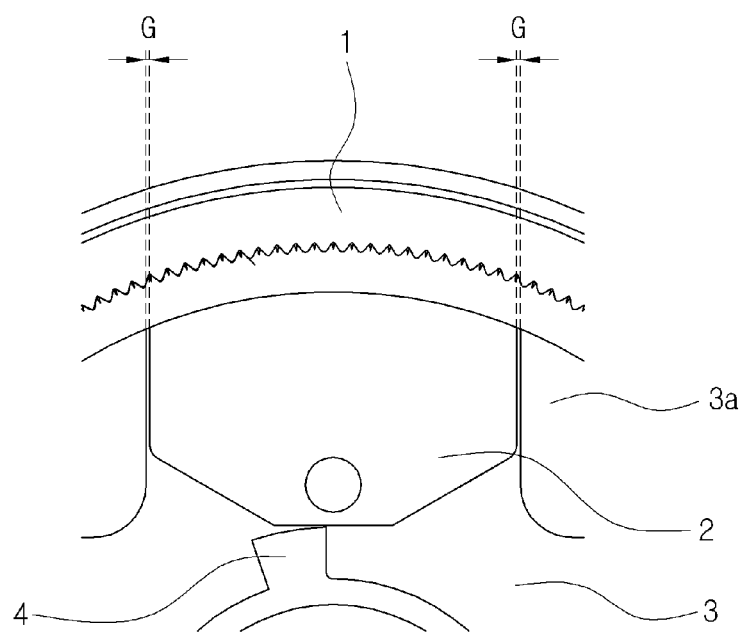
FIG. 2 is a partially enlarged view of FIG. 1.
Figure 3:
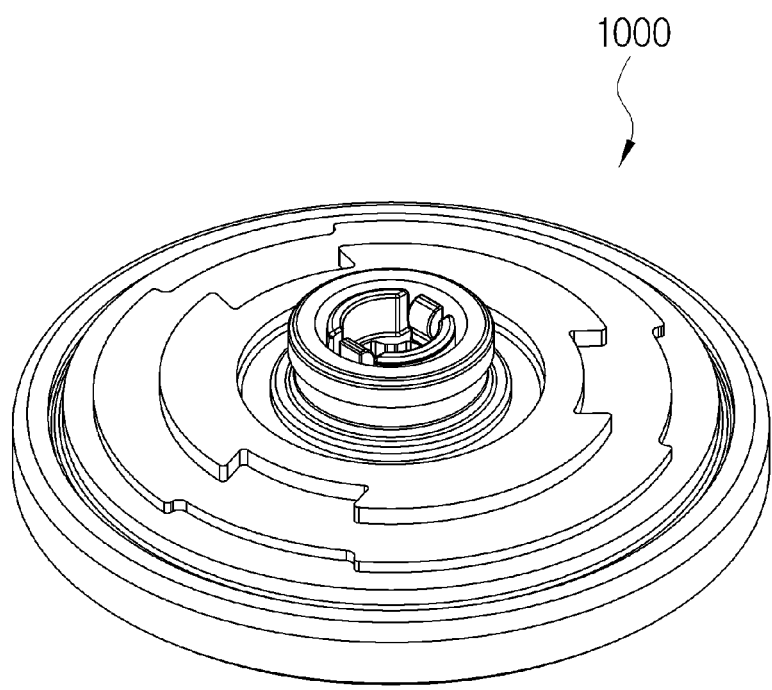
FIG. 3 is an overall perspective view of a recliner for a vehicle according to an exemplary embodiment of the present invention.
Figure 4:
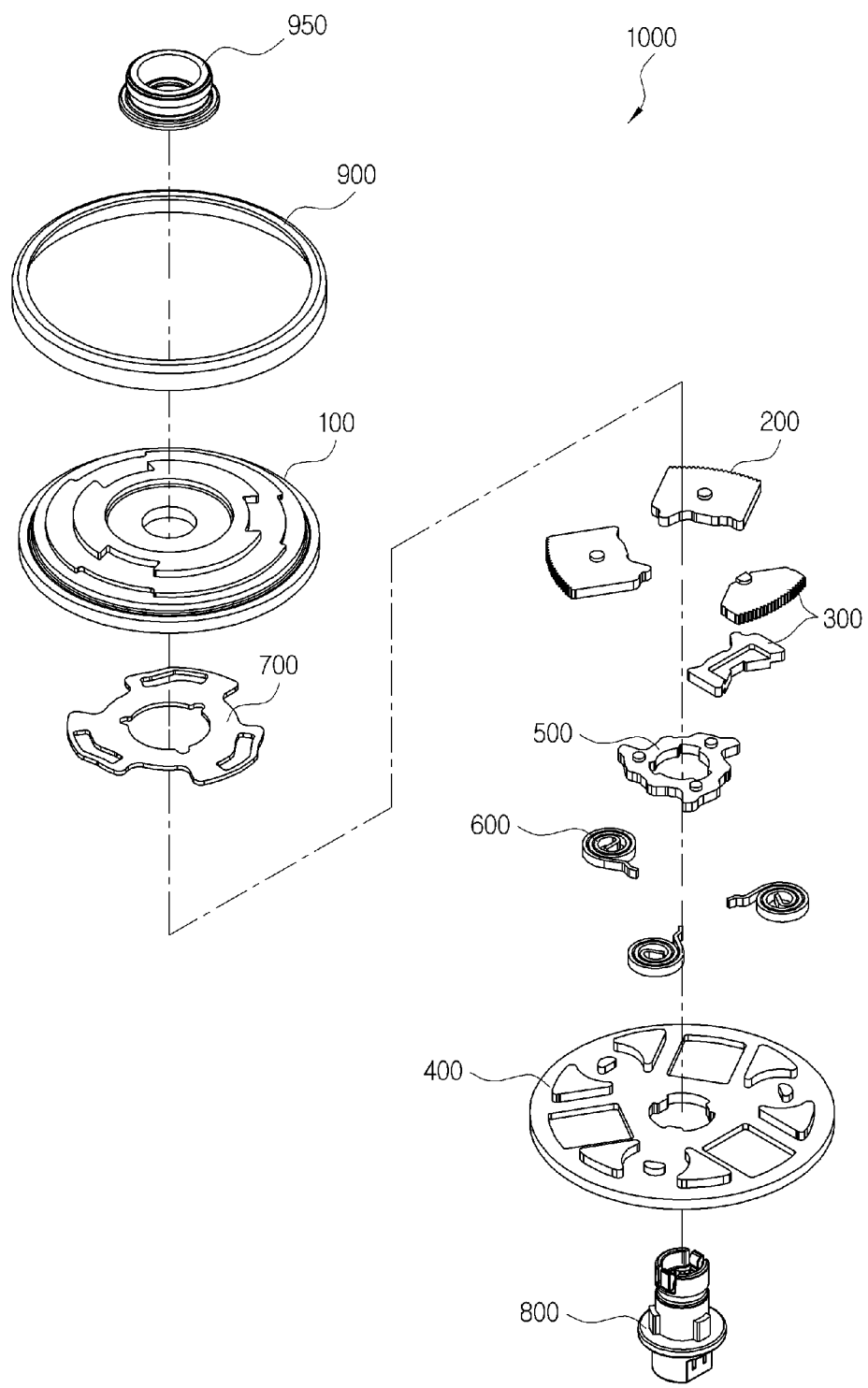
FIG. 4 is an exploded perspective view of the recliner for a vehicle according to the exemplary embodiment of the present invention.
Figure 5:
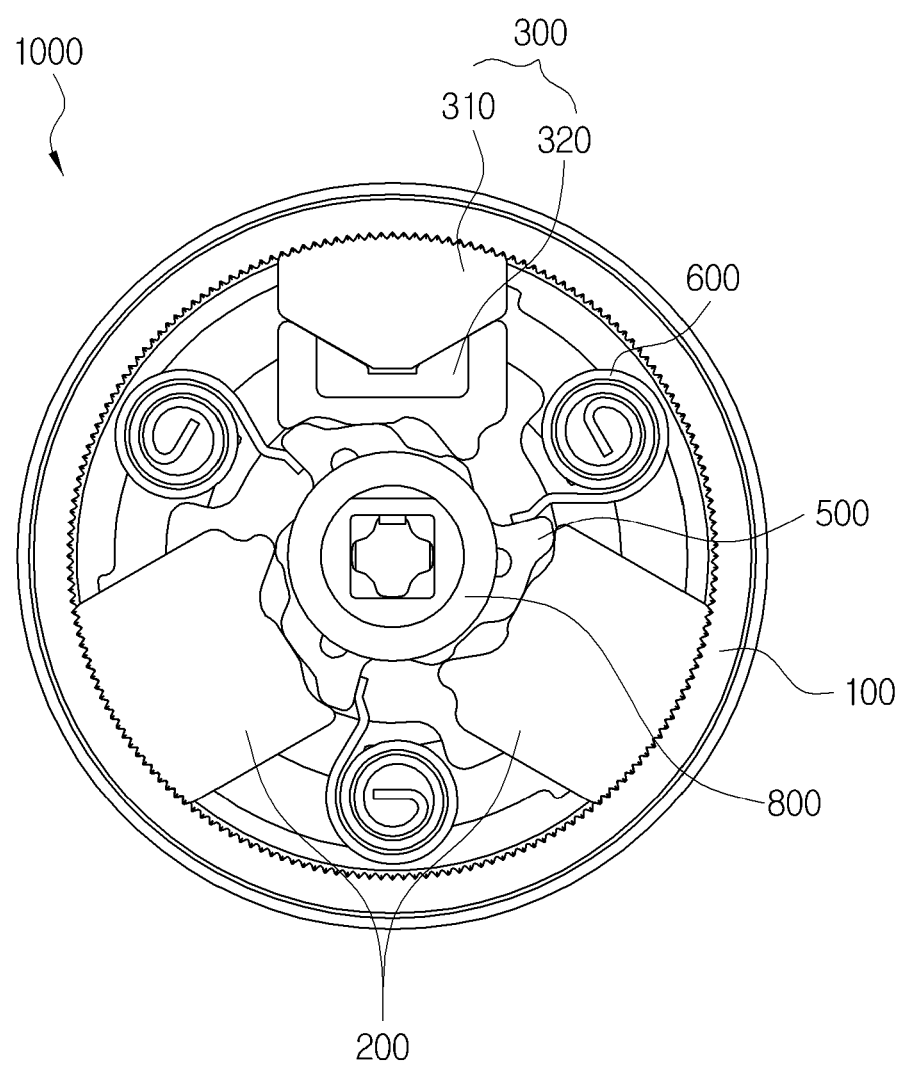
FIG. 5 is a bottom view of the recliner (holder is removed) for a vehicle according to the exemplary embodiment of the present invention.
Figure 6:
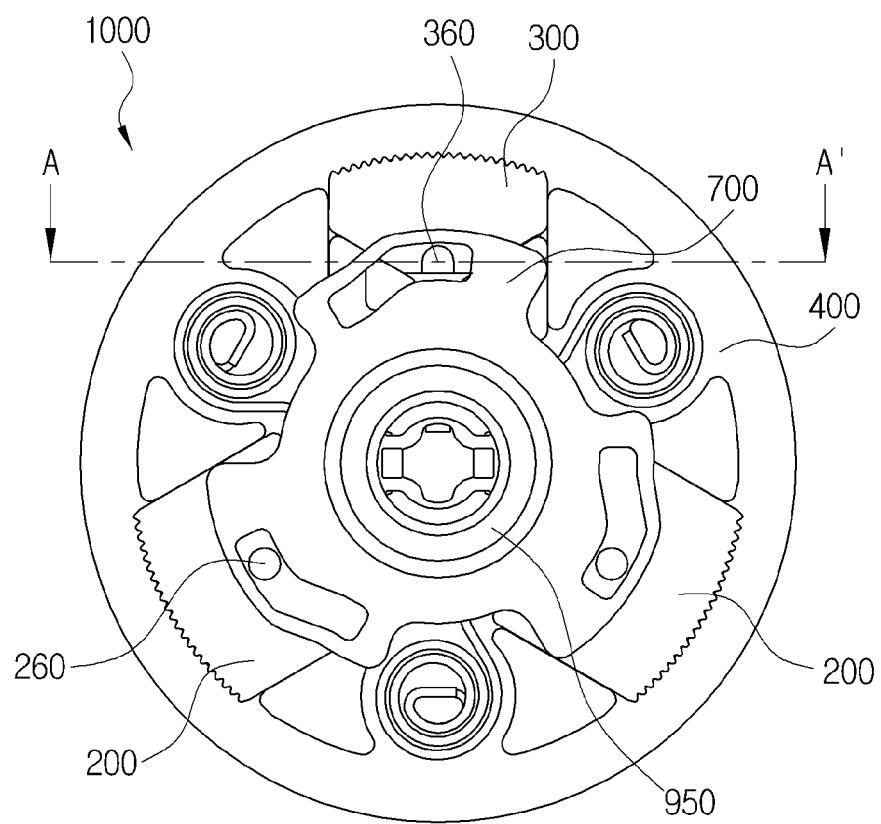
FIG. 6 is a plan view of the recliner (upper gear is removed) for a vehicle according to the exemplary embodiment of the present invention.

FIG. 3 is an overall perspective view of a recliner 1000 according to an exemplary embodiment of the present invention, FIG. 4 is an exploded perspective view of the recliner 1000, FIG. 5 is a bottom view of the recliner 1000 from which a holder 400 is removed, and FIG. 6 is a plan view of the recliner 1000 from which an upper gear 100 is removed.

Describing components of the recliner 1000 with reference to FIG. 4, the recliner 1000 is configured to include an upper gear 100 having an internal tooth formed on an inner peripheral edge thereof and connected to a seat back to control an inclination angle of the seat back by rotation, lock gear parts 200 and 300 provided with an external tooth engaged with the internal tooth and locking or unlocking a rotation of the upper gear 100 by a reciprocating motion, a holder 400 having the upper gear 100 and the lock gear parts 200 and 300 received therein and guiding the reciprocating motion of the lock gear parts 200 and 300, a cam 500 received in the holder 400 and controlling the reciprocating motion of the lock gear parts 200 and 300 by rotation, an elastic lever 600 applying elasticity to the cam 500 in a direction in which the lock gear parts 200 and 300 are engaged with the upper gear 100, a guide plate 700 rotating by interlocking with the cam 500 and fitted with the lock gear parts 200 and 300 to reciprocate the lock gear parts 200 and 300 by rotation, a shaft 800 connected to the lever and the cam 500 to transfer a driving force of the lever to the cam 500, a housing 900 coupled with the holder 400, and a cap 950 coupled with an end of the shaft 800.

For convenience, a side at which the axial upper gear 100 of the recliner is disposed is defined as an upper side, a side at which the axial holder 400 is disposed is defined as a lower side, a clockwise direction based on a circumferential direction of the recliner 1000 is defined as a left, a counterclockwise direction is defined as a right, an outside direction from an axial center of the recliner 1000 is defined as one side, and an axial center is defined as the other side.

Figure 7:
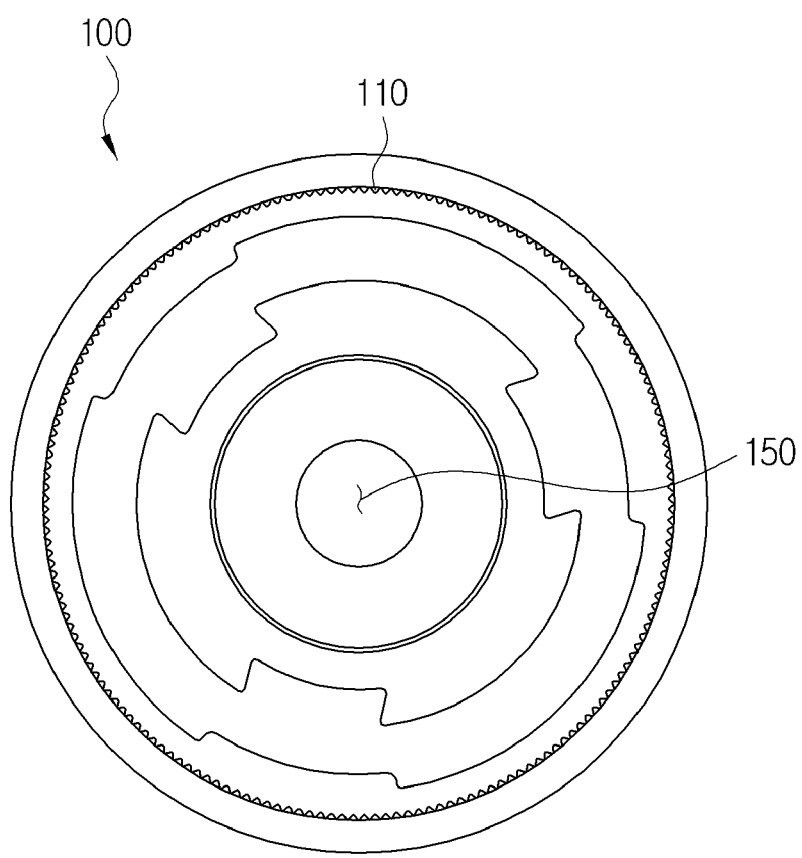
FIG. 7 is a bottom view of the upper gear according to the exemplary embodiment of the present invention.

FIG. 7 is a bottom diagram of the upper gear 100 As illustrated in FIG. 7, the upper gear 100 has a disk shape having a thickness, having a seat back coupling part formed on an upper surface thereof, and having an internal tooth 110 formed on a lower surface thereof. A circumferential portion of the upper gear 100 may protrude downward so that an internal tooth 110 is formed on a lower surface of the upper gear 100 and the internal tooth 110 may be formed along an inner peripheral edge of the protruding portion. A center of the upper gear 100 is provided with an upper gear hole 150 so that the shaft 800 is inserted thereinto.

Figure 8:
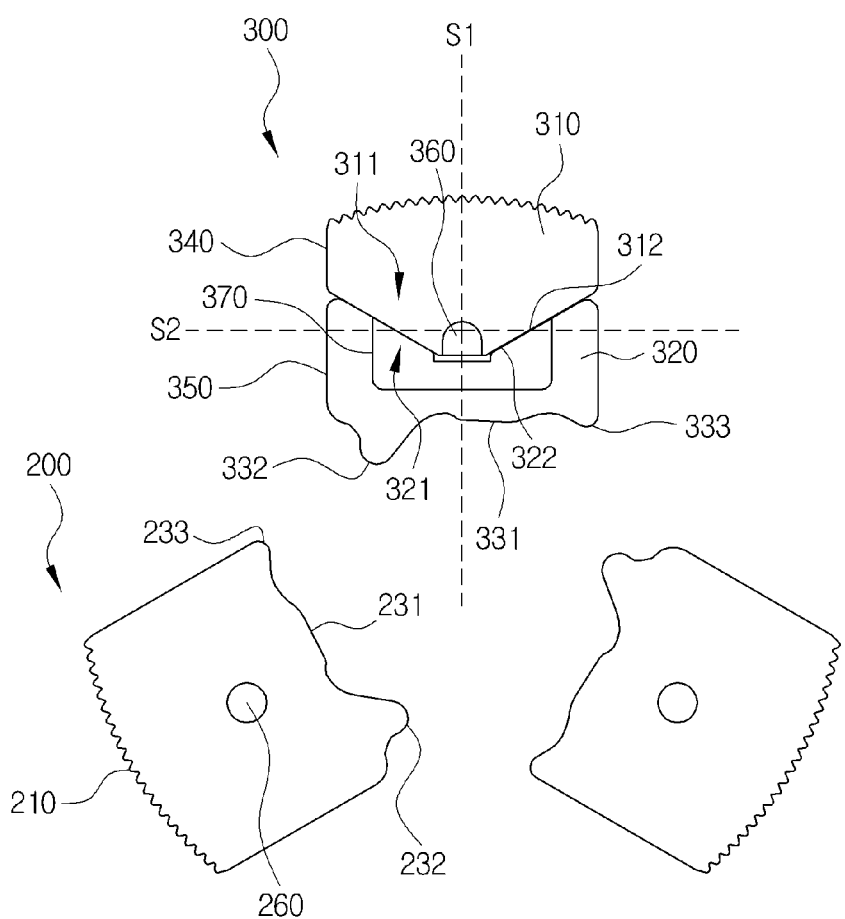
FIG. 8 is a plan view of a lock gear part according to the exemplary embodiment of the present invention.

FIG. 8 is a plan view of the lock gear parts 200 and 300. The lock gear parts 200 and 300 are configured of the first lock gear 200 and the wedge gear part 300.

An axial one side of the first lock gear 200 is provided with an external tooth 210 which is engaged with the internal tooth 110 (see FIG. 7) and is formed in the holder 400 (see FIG. 6) so as to linearly reciprocates along an axial center of the upper gear 100 from the inner peripheral edge thereof. The other side of the first lock gear 200 is configured to contact a circumferential surface of the cam 500 (see FIG. 5) and the first lock gear 200 is radially disposed in plural. A center of the other side of the first lock gear 200 is provided with a first lock protrusion 231 contacting the cam 500, a second lock protrusion 232 formed at a left of the first lock protrusion 231 so as to be spaced apart therefrom, and a third lock protrusion 233 formed at a right of the first lock protrusion 231 so as to be spaced apart therefrom. The left and right of the first lock gear 200 are provided with first slide surfaces 240 which are slid contacting the guide surface 421 (see FIG. 9) of the holder 400 to be described below. In the drawing, three lock gear parts 200 and 300 are disposed at an equal interval of 120°, but the number of lock gear parts 200 and 300 may be increased and reduced. An upper surface of the other side of the first lock gear 200 is provided with a first driving protrusion 260 which protrudes upwardly. The first driving protrusion 260 is configured to be fitted in a driving slide hole 710 of a guide plate 700 (see FIG. 11) to be described below. An operation mechanism of the first driving protrusion 260 and the guide plate 700 will be described below.

Any one of the lock gear parts 200 and 300 is configured as a wedge gear part 300. The wedge gear part 300 is configured of a second lock gear 310 and a wedge 320. The second lock gear 310 and the wedge 320 are configured to contact each other and the other side of the second lock gear 310 is provided with a lock protrusion 311 and one side of the wedge 320 is provided with a wedge groove 321 to which the lock protrusion 311 is contacted. The lock protrusion 311 and the wedge groove 321 are configured so that a lock protruding surface 312 formed on the other surface of the lock protrusion 311 surface-contacts a wedge groove surface 322 formed on one surface of the wedge groove 321. The left and right of the second lock gear 310 are provided with second slide surfaces 340 which are sliding on and contacting the guide surface 421 (see FIG. 9) of the holder 400 to be described below. An upper surface of the other side of the second lock gear 310 is provided with a second driving protrusion 360 which protrudes upwardly. The second driving protrusion 360 is configured to be fitted in the driving slide hole 710 of the guide plate 700 (see FIG. 11) to be described below. An operation mechanism of the second driving protrusion 360 and the guide plate 700 will be described below.

Further, the left and right of the wedge 320 are provided with third slide surfaces 350 which are sliding on and contacting the guide surface 421 (see FIG. 9) of the holder 400 to be described below. Further, a lower surface of the wedge 320 is provided with a wedge slide part protruding downward and the left and right of the wedge slide part are provided with wedge slide surfaces 370 which are slid along a wedge guide surface 431 (see FIG. 9) of the holder 400 to be described below. A center of the other side of the wedge 320 is provided with a first wedge protrusion 331 contacting the cam 500, a second wedge protrusion 332 formed at a left of the first wedge protrusion 331 so as to be spaced apart therefrom, and a third wedge protrusion 333 formed at a right of the first wedge protrusion 331 so as to be spaced apart therefrom.

By the above configuration, the wedge gear part 300 is configured so that the second lock gear 310 is not directly grounded to the cam 500 but is indirectly grounded to the cam 500 through the wedge 320. In this configuration, to offset a clearance of the recliner 1000 which is generated by a gap between the second and third slide surfaces 340 and 350 of the wedge gear part 300 and the guide surface 421 (see FIG. 9) of the holder, the lock protrusion 311 and the wedge groove 321 have the following configuration. The lock protrusion 311 and the wedge groove 321 are formed to be bilaterally symmetric based on a first reference line S1 which connects the inner peripheral edge of the upper gear 100 to the axial center thereof. The lock protruding surface 312 is formed on a second reference line S2 vertical to the first reference line S1 to have a predetermined inclination angle and the wedge groove surface 322 is formed on the second reference line S2 to have a predetermined inclination angle so as to correspond to the lock protruding surface 312. In particular, the lock protruding surface 312 and the wedge groove surface 322 are formed to be inclined toward one side from the second reference line S2.

Figure 12:
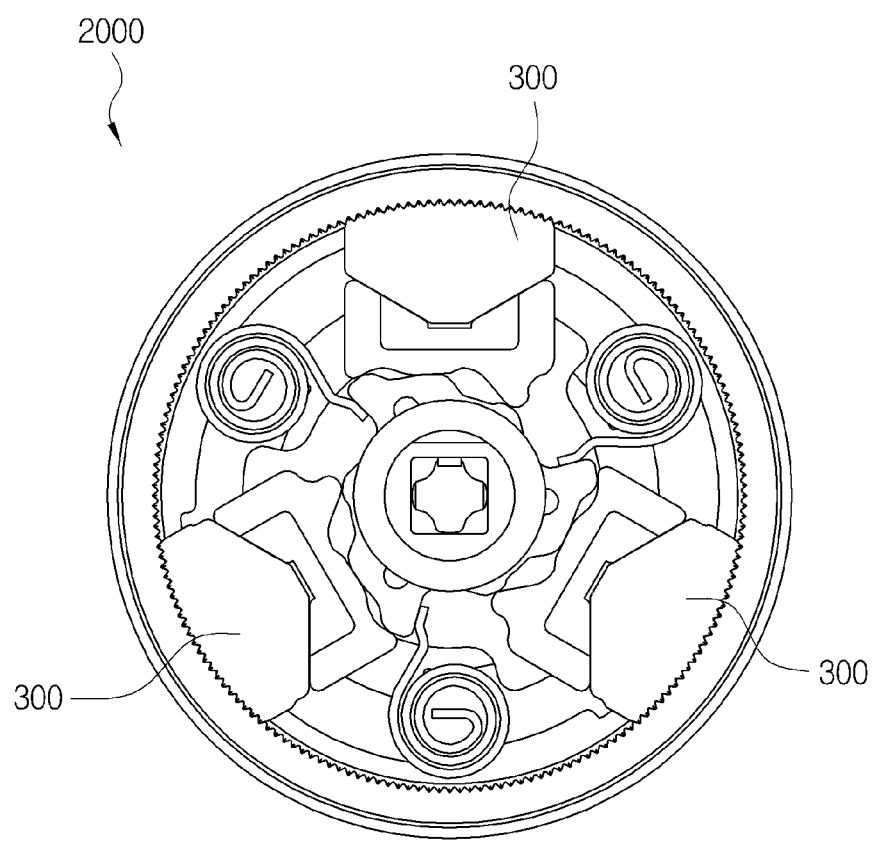
FIG. 12 is a bottom view of a recliner (holder is removed) for a vehicle according to another exemplary embodiment of the present invention.

It is illustrated that the wedge gear part 300 illustrated in FIG. 8 is formed in any one of the three lock gear parts 200 and 300, but as illustrated in a recliner 2000 for a vehicle according to another exemplary embodiment of the present invention illustrated in FIG. 12, all the three lock gear parts may be configured as the wedge gear part 300.

The first lock gear 200 having a single shape is directly grounded and supported by the cam 500 and thus the external tooth 210 of the first lock gear 200 may be firmly engaged with the internal tooth 110 of the upper gear 100 (see FIG. 7) and the second lock gear 310 formed in the wedge gear part 300 is not directly grounded to the cam 500 but is indirectly supported to the wedge 320 grounded to the cam 500 so as to be firmly engaged with the internal tooth 110 of the upper gear 100.

A locking condition to engage the lock gear parts 200 and 300 with the upper gear 100 is made by the rotation of the cam 500, and at the time of rotating the cam 500, in the first lock gear 200, a first protrusion 510 formed at a central ground point of the cam 500 is grounded to the first lock protrusion 231 and thus the external tooth 210 of the first lock gear 200 moves in a direction of the internal tooth 110 of the upper gear 100 to be engaged therewith.

When the wedge 320 is pushed by the rotation of the cam 500, the wedge gear parts 300 interlock each other and thus the second lock gear 310 is engaged with the upper gear 100. In this case, the first protrusion 510 at the central ground point of the cam 500 is grounded to the first wedge protrusion 331 of the wedge 320 and thus the wedge 320 moves the second lock gear 310 in the direction of the internal tooth 110 of the upper gear 100 to be engaged therewith. Therefore, after the external tooth of the second lock gear 310 and the internal tooth 110 of the upper gear 100 is engaged by the movement of the wedge 320, the wedge slide surface 370 of the wedge 320 is to slide along the wedge guide surface 431 of the holder 400 by the first protrusion 510 of the cam 500 and the lock groove 321 of the wedge 320 is to slide along the inclined surface of the lock protrusion 311.

In this case, the reason why the lock protruding surface 312 and the wedge groove surface 322 are formed to be inclined toward one side from the second reference line S2 is to effectively disperse a concentration stress of the second lock gear 310 and the wedge 320 against an external force load, which will be in detail below.

In the case in which the lock protruding surface 312 and the wedge groove surface 322 are formed to be inclined toward one side from the second reference line S2, when a load is applied to the front/back of the recliner, a component force of the second lock gear 310 spaces an inner side of the holder 400 from an outer side of the wedge 320 and the concentration stress is applied only to a single surface of the lock protrusion 311 by a sliding action direction of the lock protruding surface 312, such that the support force of the wedge 320 to the second lock gear 310 is reduced and thus the engagement force therebetween is reduced, thereby reducing the engagement strength.

On the other hand, when the lock protruding surface 312 and the wedge groove surface 322 are formed to be inclined toward one side from the second reference line S2, prevent reduction of the engagement force between the upper gear 100 and the second lock gear 310 because of the component force in the vertical direction of the sliding force generated from the lock protruding surface 312 and the wedge groove surface 322 and increase the strength by increasing the load distribution forces on the holder 400 when the engagement force because of direction of the component force of the wedge 320 induced to inner surface of the holder 400.

Figure 9:
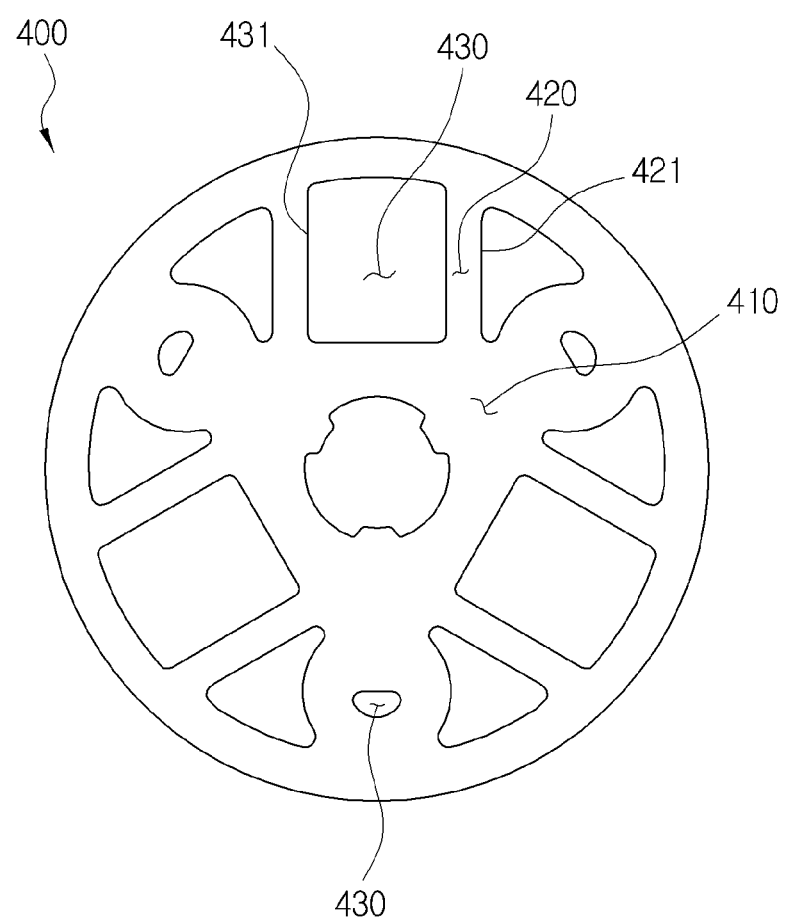
FIG. 9 is a plan view of a holder according to the exemplary embodiment of the present invention.

FIG. 9 is a plan view of the holder 400. The holder 400 has a disk shape having a thickness and the upper surface of the holder 400 is provided with a main receiving space 410 in which the upper gear 100 and the lock gears 200 and 300 are received and the lefts and rights of each of the three guide spaces 420 radially formed to guide the linear reciprocating motion of the lock gear parts 200 and 300 are provided with guide parts which protrude upwardly and both sides of the guide part are provided with guide surfaces 421. Further, the guide space 420 is provided with a wedge guide groove 430 depressed downward so that the foregoing wedge slide part is fitted therein. The left and right of the wedge guide groove 430 are provided with the wedge guide surfaces 431 to be slid contacting the wedge slide surface 360. Further, an elastic lever space 440 for installing the elastic lever 600 is formed between the plurality of lock gear parts 200 and 300. The elastic lever space 440 is provided corresponding to the number of lock gear parts 200 and 300.

Figure 10:
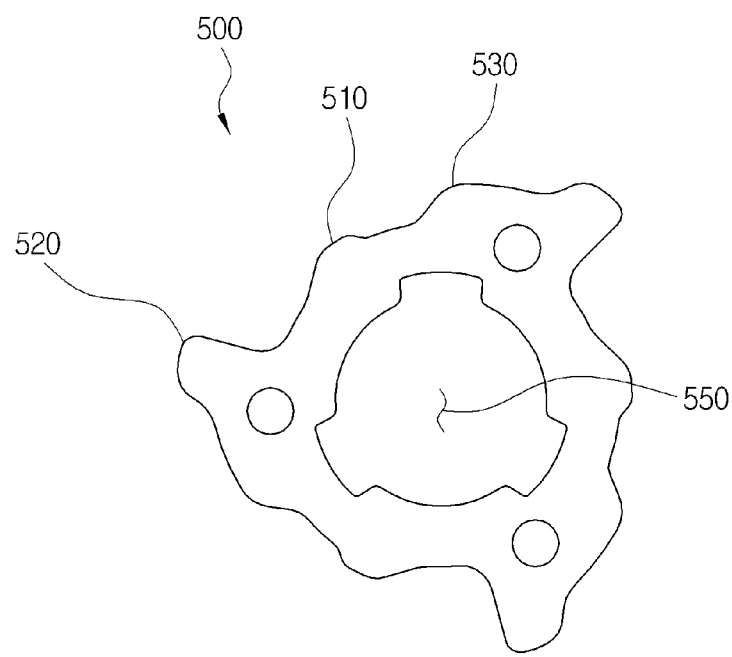
FIG. 10 is a plan view of a cam according to the exemplary embodiment of the present invention.

FIG. 10 is a plan view of the cam 500. As illustrated in FIG. 10, the cam 500 has a disk shape and the first protrusions 510 contacting the other ends of the lock gear parts 200 and 300 are formed to protrude on the circumferential surface of the cam 500 in one side direction. One surface of the first protrusion 510 is formed to contact the other surfaces of the first lock protrusions 231 or the first wedge protrusions 331 of the lock gear parts 200 and 300 and the lock gear parts 200 and 300 are formed to be engaged and fixed with the upper gear 100 through the first protrusions 510 by rotating the cam 500. In this case, the left and right of the first protrusion 510 are provided with the second protrusions 520 and the third protrusions 530 which are spaced apart from each other. The second protrusion 520 and the third protrusion 530 protrude in one direction of the circumferential surface of the cam and one surfaces thereof contact the other surfaces of the lock gear parts 200 and 300. One surface of the second protrusion 520 contacts the other surface of the second lock protrusion 232 or the second wedge protrusion 332 and one surface of the third protrusion 530 contacts the other surface of the third lock protrusion 233 or the third wedge protrusion 333 to additionally fix the lock gear parts 200 and 300, which are configured to increase the fixing rigidity of the recliner 1000 at the time of generating a front or back external pressure of the seat back. A center of the cam 500 is provided with a cam hole 550 so that the shaft 800 is inserted thereinto.

Referring to FIG. 5, the elastic lever 600 is configured to apply elasticity to the cam 500 in a direction in which the lock gear parts 200 and 300 are engaged with the upper gear 100. The elastic lever 600 is configured as a torsion spring and is mounted in an elastic lever space 440 of the holder 400. The elastic lever 600 is provided corresponding to the number of lock gear parts 200 and 300. Therefore, each elastic lever 600 is configured to apply elasticity to the cam 500 to increase the engagement force of the lock gear parts 200 and 300.

Figure 11:
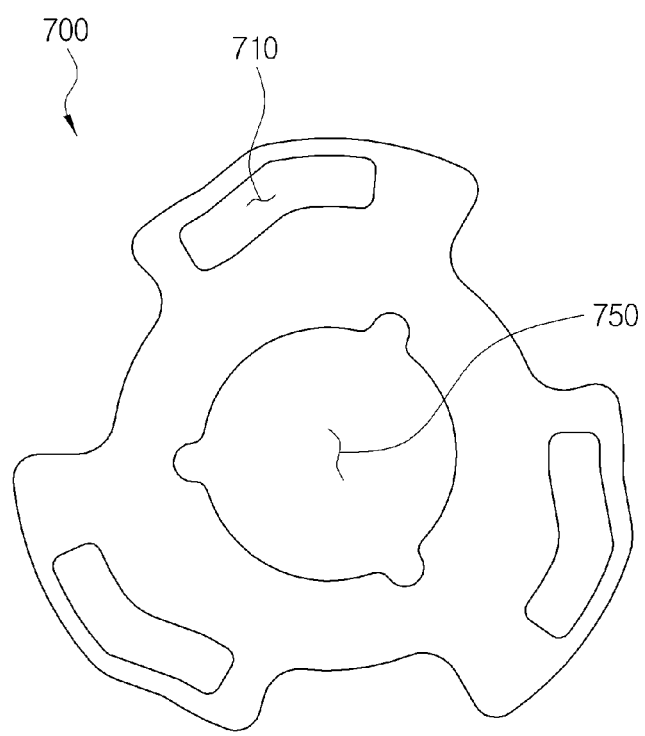
FIG. 11 is a plan view of a guide plate according to the exemplary embodiment of the present invention.

FIG. 11 is a plan view of the guide plate 700. Referring to FIGS. 6 and 11, the guide plate 700 is provided over the lock gear parts 200 and 300. The guide plate 700 has a disk shape and is penetrately provided with the driving slide hole 710 in which the first and second driving protrusions 260 and 360 protruding toward the upper surfaces of the lock gear parts 200 and 300 are fitted and is configured to linearly reciprocate the lock gear parts 200 and 300 by rotation. A center of the guide plate 700 is provided with the guide plate hole 750 into which the shaft 800 is inserted. The guide plate 700 rotates interlocking the cam 500 and linearly reciprocates the lock gear parts 200 and 300 at the time of rotating the cam 500. That is, referring to FIG. 6, the lock gear parts 200 and 300 linearly moves to the other sides of the lock gear parts 200 and 300 by rotating the guide plate 700 clockwise to be separated from the upper gear 100 and the lock gear parts 200 and 300 linearly moves to one side by rotating counterclockwise to adhere to the upper gear 100. In this case, the second driving protrusion 360 provided at the wedge gear part 300 may be formed on the lower surface of the first lock gear 310.

As the shaft 800, a general shaft connecting the lever driven by a user to the cam 500 may be used and therefore the detailed description thereof will be omitted.

A housing 900 has an annular shape and the lower portion thereof is coupled with the upper portion of the holder 400 to form a space in which components of the recliner are received. The cap 950 is coupled with an upper end of the shaft 800 to couple the holder inserted into the shaft 900, the cam 500, and the upper gear 100.

Hereinafter, an operation of the present invention configured as described above will be described with reference to the drawings.

Figure 13:
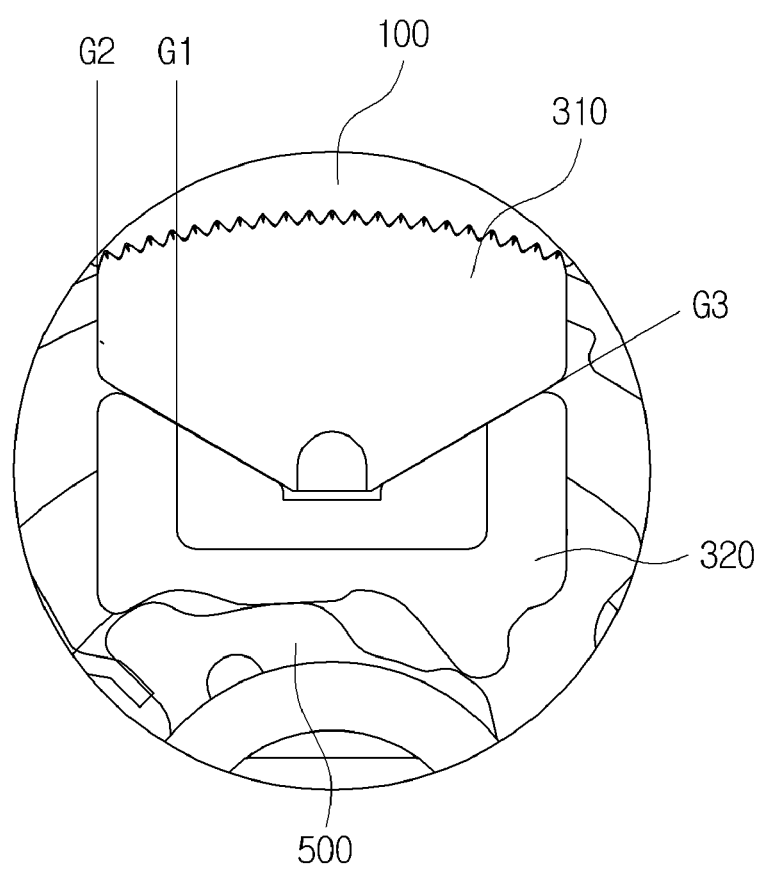
FIGS. 13 to 16 are operational state diagrams of the recliner for a vehicle according to the exemplary embodiment of the present invention.
Figure 14:
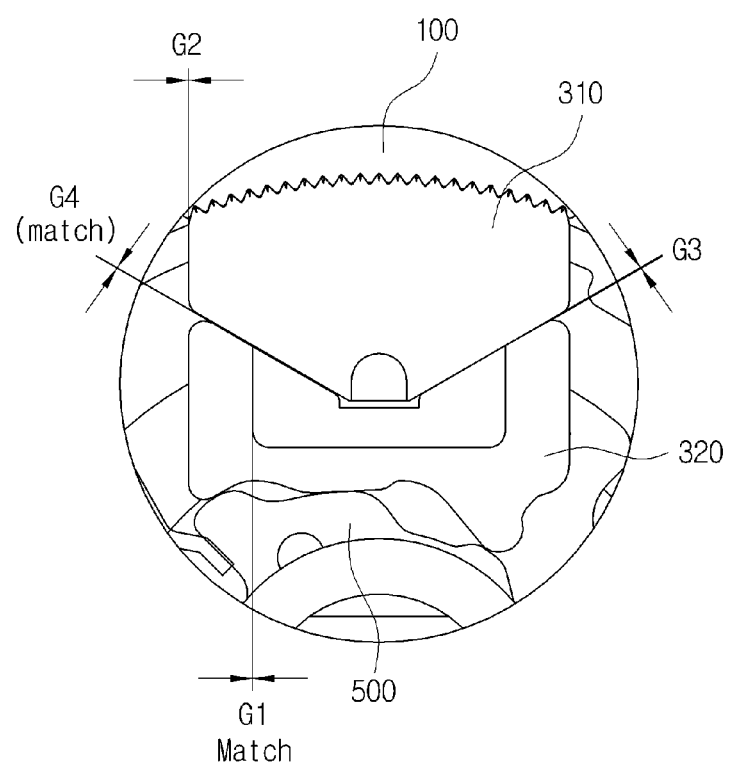
Figure 15:
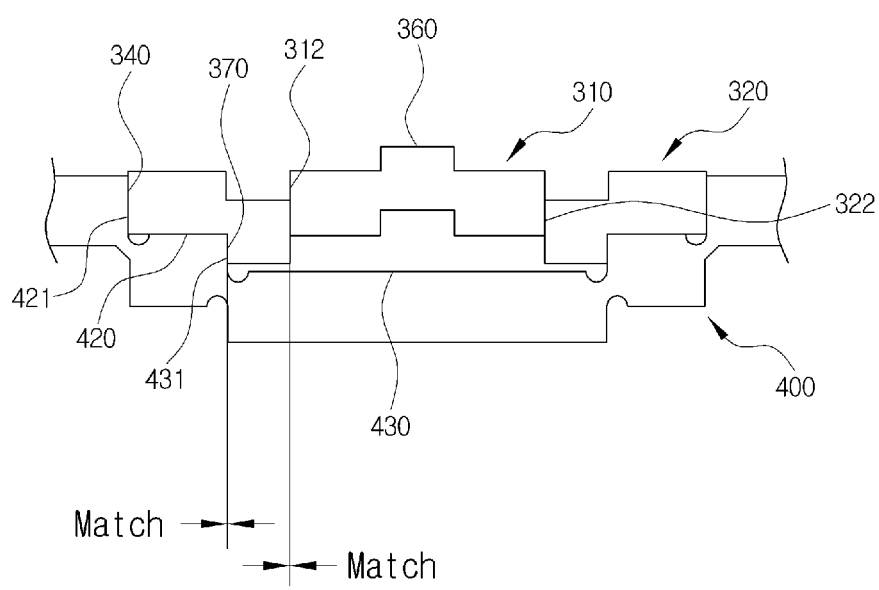
Figure 16:
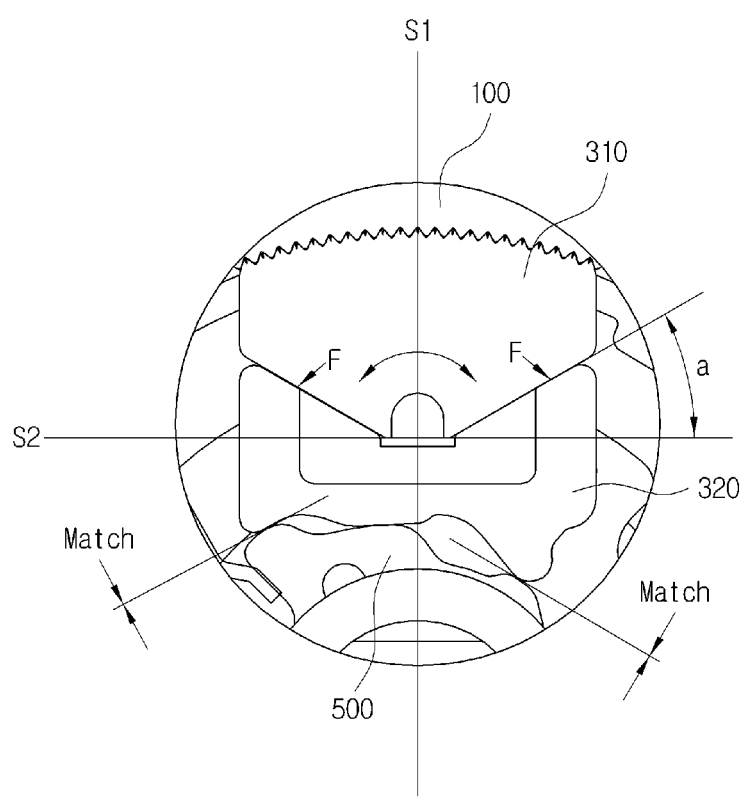

FIGS. 13, 14, and 16 illustrate a partial plan view of an operational state of the recliner for a vehicle according to the exemplary embodiment of the present invention and FIG. 15 is a cross-sectional view taken along the line AA' of FIG. 6 for describing an operational state of the recliner for a vehicle according to the exemplary embodiment of the present invention, that is, illustrates the coupled cross-sectional view of the wedge gear part 300 with the holder 400.

Referring to FIG. 13, in the state in which the wedge 320 incompletely supports the second lock gear 310, a second gap G2 is formed between the second slide surface of the second lock gear 310 and the guide surface of the holder 400 and a first gap G1 is formed between the wedge slide surface of the wedge 320 and the wedge guide surface of the holder 400. To allow the wedge 320 to completely support the second lock gear 310, the wedge 320 moves to a position at which the first gap G1 is offset along an inclined surface of the lock protrusion of the second lock gear 310. The clearance due to the existence of the first gap G1 as illustrated in FIGS. 14 and 15 becomes zero matching by the movement of the wedge 320, the clearance of the second gap G2 is reduced by the offset value of the first gap G1, and an clearance of third and fourth gaps G3 and G4 is reduced by a displacement value of the inclined surface on which the wedge 320 moves due to the first gap G1. This means that a front clearance amount of the seat back fixed with the recliner 100 due to the wedge 320 is improved.

Referring to FIG. 16, second and third protrusions spaced apart from the first protrusion are to effectively prevent an inclination and a lifting according to a load direction of the wedge 320 so as not to separate the external teeth of the first and second lock gears from the internal tooth of the upper gear 100 at the time of the front/back external force load of the seat back. At the time of the front load, the second protrusion is grounded and supported to the second wedge protrusion in the state in which the first protrusion of the cam 500 is grounded to the first wedge protrusion and at the time of the back load, the third protrusion is grounded to the third wedge protrusion in the state in which the first ground protrusion is grounded to the first wedge protrusion to increase the support force of the cam 500 to the wedge 320, thereby increasing the engagement strength of the lock gear parts 200 and 300 with the upper gear 100.

Figure 17:
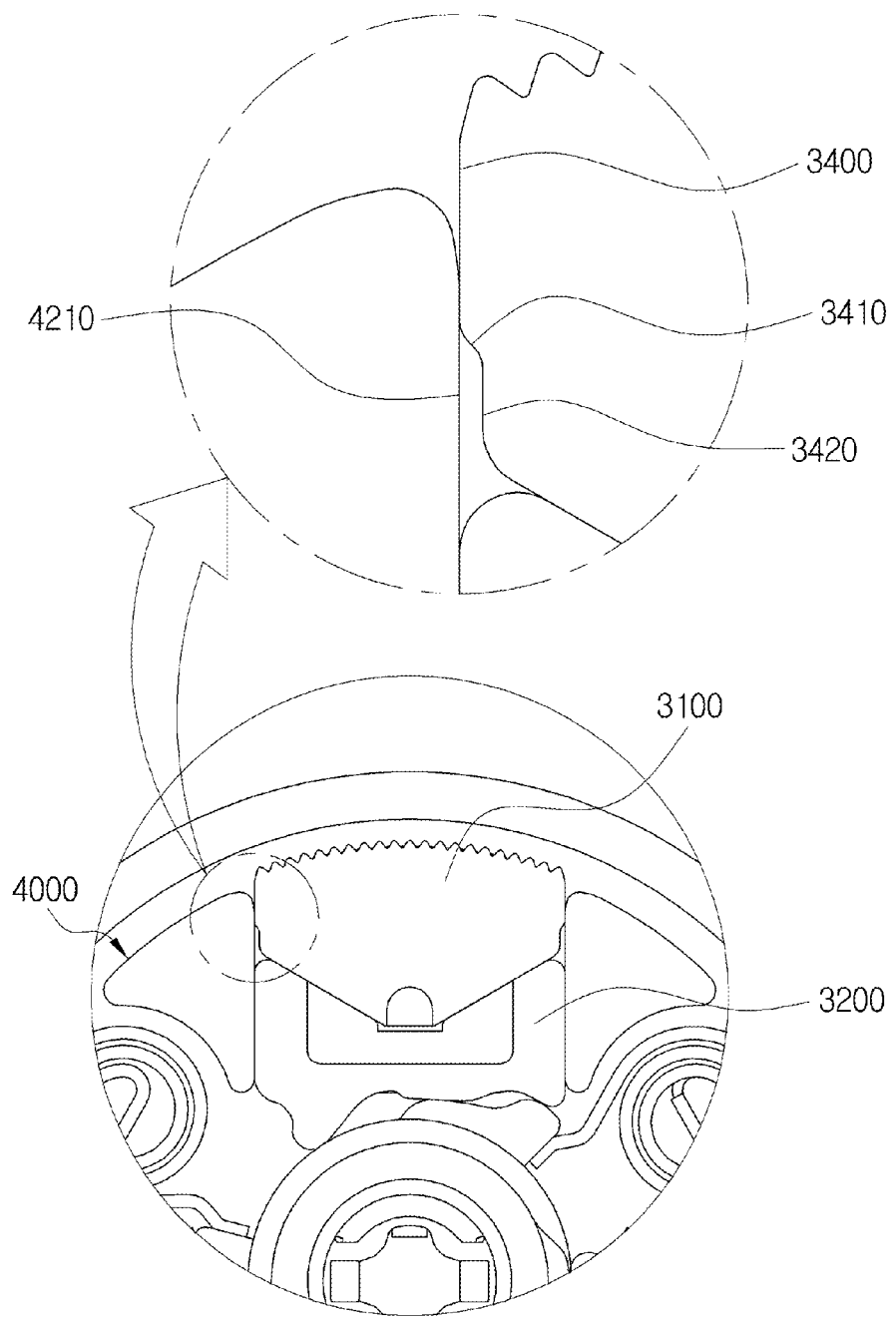
FIG. 17 is a plan view of a lock gear part according to another exemplary embodiment of the present invention.
Figure 18:
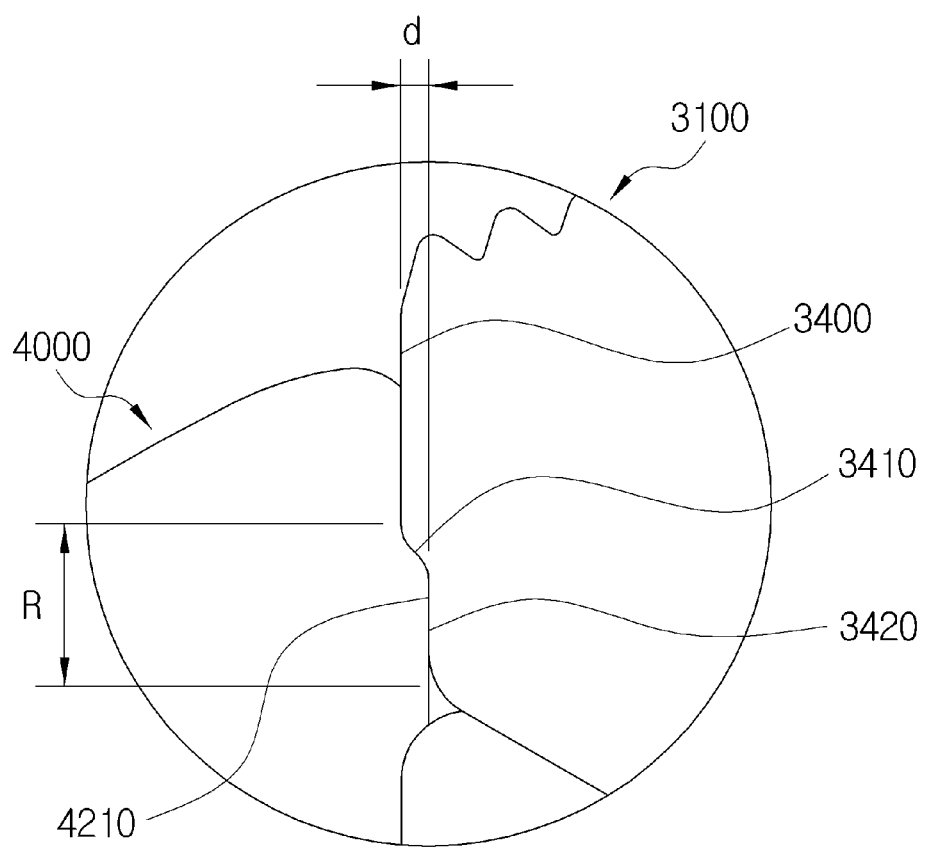
FIG. 18 is an operational state diagram of FIG. 17.

FIG. 17 is a plan view of wedge gear parts 3100 and 3200 of a recliner 1000 according to another exemplary embodiment of the present invention and FIG. 18 is a plan view of an operational state of the wedge gear parts 3100 and 3200 of the recliner 1000 according to another exemplary embodiment of the present invention.

As described with reference to FIG. 9, in a holder 4000, left and right sides of the wedge gear parts 3100 and 3200 are provided with guide parts protruding upwardly so as to guide a linear reciprocating motion of the wedge gear parts 3100 and 3200 and both sides of the guide part are provided with guide surfaces 4210. In this case, the guide surface 4210 may be deformed according to the load applied to the left or right through the wedge gear parts 3100 and 3200 and when the guide surface 4210 is deformed, the clearance of the recliner 1000 may be increased and therefore to prevent the clearance of the recliner 1000 according to the deformation of the guide surface 4210, the wedge gear parts 3100 and 3200 according to another exemplary embodiment of the present invention have the following configuration.

The wedge gear parts 3100 and 3200 are configured of the second lock gear 3100 and the wedge 3200. Further, the second lock gear 3100 is provided with a second slide surface 3400 which is slid contacting the guide surface 4210 of the holder 4000. In this case, one side of the second slide surface 3400 is provided with stepped parts 3410 and 3420 which are deformed inwardly in a circumferential direction of the recliner 1000. The step parts 3410 and 3420 are configured of the inclined surface 3410 which is inclinedly formed inwardly in the circumferential direction from one side of the second slide surface 3400 and a stepped surface 3420 extending in one side direction from one side of the inclined surface 3410. Through the configuration of the stepped parts 3410 and 3420 as described above, when the external force is applied to the left or right in the circumferential direction of the recliner 1000 in the state in which the second lock gear 3100 and the upper gear (not illustrated) are collected, the deformation d of the guide surface 4210 contacting the second slide surface 3400 occurs. In this case, a portion of the guide surface 4210 is inserted into the stepped parts 3410 and 3420 while the guide surface 4210 is deformed to support the inclined surface 3410 connecting the second slide surface 3400 to the stepped surface 3420. Therefore, a reinforcing region R is formed between the stepped parts 3410 and 3420 and the wedge 3200 to firmly support the second lock gear 3100 even though the deformation d of the guide surface 4210 occurs. The stepped parts 3410 and 3420 are formed in the second lock gear 3100, but may also be formed in the first lock gear 200 (see FIG. 8).

Figure 19:
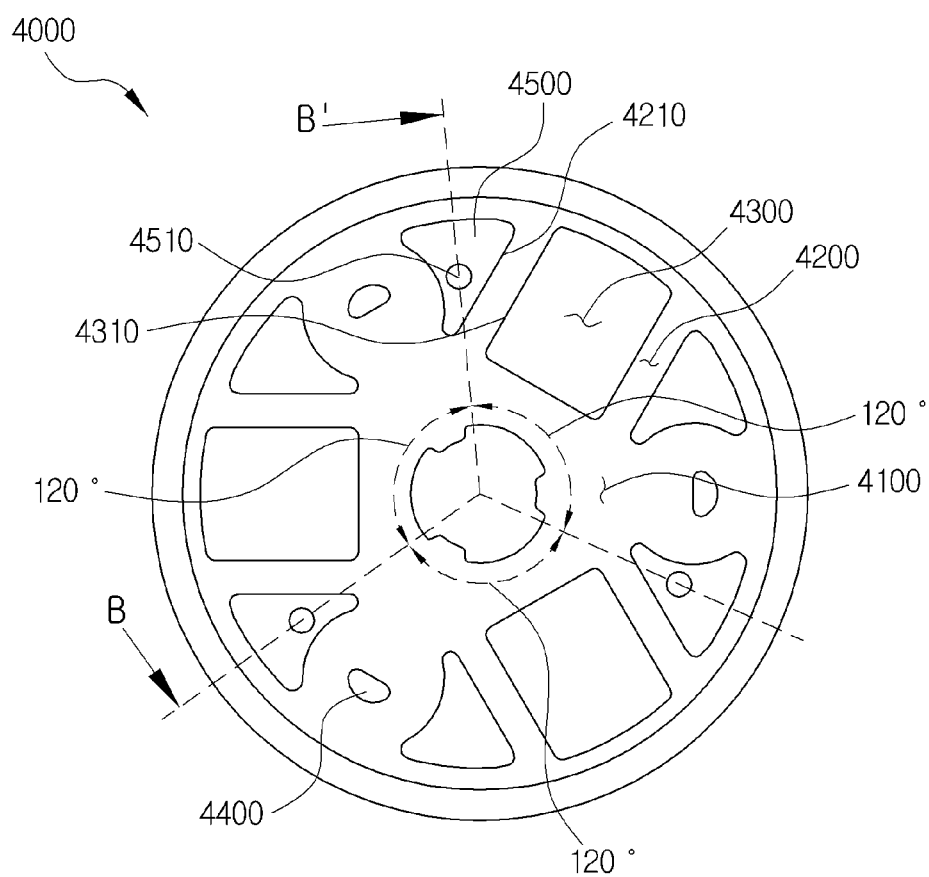
FIG. 19 is a plan view of a holder according to another exemplary embodiment of the present invention.
Figure 20:
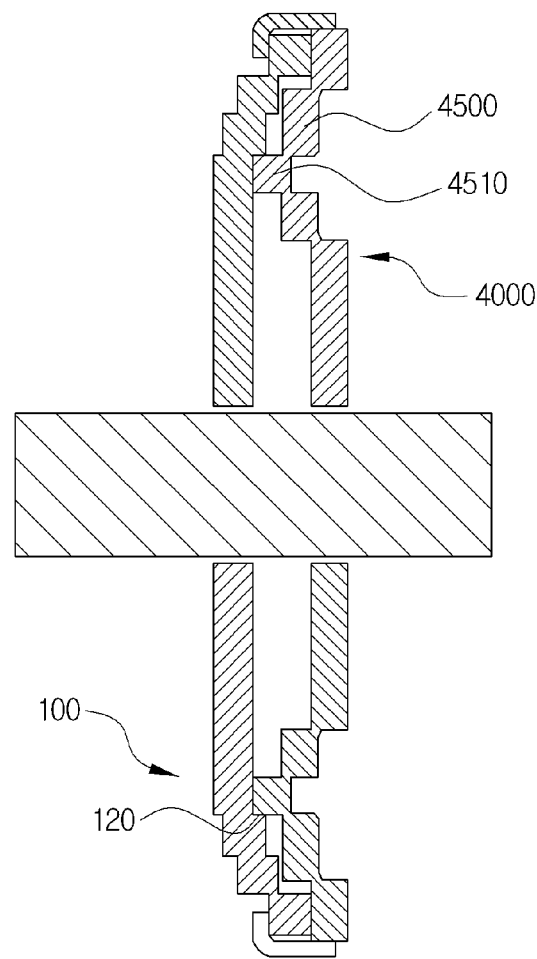
FIG. 20 is a coupled cross-sectional view of the holder and the upper gear according to another exemplary embodiment of the present invention.

FIG. 19 is a plan view of the holder 4000 according to another exemplary embodiment of the present invention and FIG. 20 is a coupled cross-sectional view of the holder 4000 and the upper gear 100 according to another exemplary embodiment of the present invention.

The holder 4000 has a disk shape having a thickness and the upper surface of the holder 400 is provided with a main receiving space 4100 in which the upper gear 100 and the lock gears 200 and 300 are received and the lefts and rights of each of the three guide spaces 4200 radially formed to guide the linear reciprocating motion of the lock gear parts 200 and 300 are provided with guide parts 4500 which protrude upwardly and both sides of the guide part are provided with guide surfaces 4210. Further, the guide space 4200 is provided with a wedge guide groove 4300 depressed downward so that the foregoing wedge slide part is fitted therein. The left and right of the wedge guide groove 4300 are provided with the wedge guide surfaces 4310 to be slid contacting the wedge slide surface 360. Further, an elastic lever space 4400 for installing the elastic lever 600 is formed between the plurality of lock gear parts 200 and 300. The elastic lever space 4400 is provided corresponding to the number of lock gear parts 200 and 300.

In this case, an upper surface of the guide part 4500 is provided with a holder protrusion 4510 which protrudes upwardly. The holder protrusion 4510 has a cylindrical shape. In the drawing, the holder protrusion 4510 is formed only in any one of the guide parts 4500 which are formed at both sides of the lock gear parts 200 and 300 but may also be formed at both of the guide parts. The plurality of holder protrusions 4510 are formed at an equal interval along the circumferential direction of the recliner 1000. Therefore, three to six holder protrusions 4510 may be formed on the recliner 1000 in which three lock gear parts 200 and 300 are formed. As illustrated, when the three holder protrusions 4510 are formed, the holder protrusions 4510 may be disposed at an interval of 120° based on the rotating axis of the recliner 1000. Further, distances from the rotating shaft of the recliner 1000 to each of the holder protrusions 4510 are the same. As illustrated in FIG. 20, the holder protrusion 4510 is configured to have an outer peripheral edge contacted with the inner peripheral edge of the rotating guide part 120 depressed upwardly from the lower surface of the upper gear 100 and is configured to guide the rotation of the holder 4000 without vibration at the time of unlocking the holder 4000. That is, when the recliner 1000 according to the exemplary embodiment of the present invention is mounted on the seat as illustrated in FIG. 20, the upper and lower surfaces of the recliner 1000 are horizontally mounted on a ground. In this case, the downward rotation and the clearance of the recliner 1000 due to a self weight of the upper gear 100 are suppressed by the holder protrusion 4510 and the rotating guide part 120.

Describing in more detail the effect according to the foregoing configuration, the slide surface for the rotation of the upper gear 100 is inserted with the holder protrusion 4510 of the holder 4000 through the rotating guide part 120 spaced apart from the internal tooth 110 in one side direction, not through the internal tooth 110 of the upper gear 100 to rotate the upper gear 100, thereby preventing an interference joint between the internal tooth and the external tooth which may be generated at the time of rotating the upper gear 100 and more easily managing the clearance of an inner diameter and an outer diameter for smoothly operating the upper gear and the holder.

Further, the easiness may uniformly optimize the clearance among the upper gear, the lock gear, and the holder and therefore a deviation in the central shaft of the recliner may be minimized, which improves the engaged degree between the upper gear and the lock gear to prevent the clearance of the recliner due to the engagement unbalance and improve the comfort of the passenger due to the stable engagement.

As set forth above, according to the exemplary embodiments of the present invention, the recliner for a vehicle having a wedge may absorb the machining tolerance and the gap of the upper gear and the lock gear by using the wedge at the time of engaging the upper gear with the lock gear to improve the clearance, thereby providing the good ride comfort to the passenger.

Further, the engagement force of the lock gear with the upper gear using the wedge may be increased and the concentrated stress on the holder may be dispersed to increase the strength of the recliner.

In addition, the recliner for a vehicle having a wedge is provided with the front protrusion and the back protrusion corresponding to the front or back external force load of the seat back in addition to the main protrusion formed in the cam to increase the support force of the wedge and the lock gear to increase the engagement force of the lock gear with the upper gear depending on the front or back external force of the seat back, thereby increasing the strength of the recliner.

The present invention should not be construed to being limited to the above-mentioned exemplary embodiment. The present invention may be applied to various fields and may be variously modified by those skilled in the art without departing from the scope of the present invention claimed in the claims. Therefore, it is obvious to those skilled in the art that these alterations and modifications fall in the scope of the present invention.

What is claimed is:
1. A recliner for a vehicle having a wedge, comprising:
an upper gear having an internal tooth formed on an inner peripheral edge thereof and connected to a seat back to control an inclination angle of the seat back by rotation;
lock gear parts each provided with an external tooth engaged with the internal tooth and locking or unlocking a rotation of the upper gear by a linear reciprocating motion of the lock gear parts;

a holder, with which the upper gear and the lock gear parts are engaged so as to guide the linear reciprocating motion of the lock gear parts; and a cam engaged with the holder and the lock gear parts and controlling the linear reciprocating motion of the lock gear parts by rotation, wherein the lock gear parts include a first lock gear and a wedge gear part;

wherein the wedge gear part includes a second lock gear and a wedge;

wherein the second lock gear includes the external tooth at one end thereof and a lock protrusion at the other end thereof, and a wedge includes a wedge groove at one end thereof, the wedge groove contacting the lock protrusion and the other end of the wedge contacting with the cam; and wherein the lock protrusion and the wedge groove have a width narrowing toward a central axis of the recliner.

2. The recliner of claim 1, further comprising:

an elastic lever applying elasticity to the cam in a direction in which the lock gear parts are engaged with the upper gear, wherein the elastic lever is radially provided in the holder.

3. The recliner of claim 2, wherein the lock gear parts are radially disposed in the holder and the elastic lever is disposed between the lock gear parts.

4. The recliner of claim 1, wherein the cam includes:

a first protrusion; and second and third protrusions formed at both sides in a circumferential direction of the first protrusion and spaced apart from the first protrusion, wherein the first, second and third protrusions contact the first lock gear or the wedge gear part.

5. The recliner of claim 4, wherein when any one of the first, second, and third protrusions contacts the other end of the lock gear part, the other of the second and third protrusions is spaced apart from the other end of the lock gear part.

6. The recliner of claim 1, further comprising:

a driving protrusion protruding in an axial direction of the recliner and formed on the lock gear parts; and a guide plate rotating by interlocking the cam and provided with a driving groove into which the driving protrusion is inserted to reciprocate the lock gear parts by the rotation of the cam.

7. The recliner of claim 6, wherein the driving protrusion is formed on the second lock gear.

8. The recliner of claim 1, wherein the holder is protrudedly provided with a guide part of which the guide surfaces are formed at both sides in a circumferential direction of the recliner so as to guide the linear reciprocating motion of the lock gear parts, both sides in the circumferential direction of the lock gear parts are provided with a slide surface sliding on and contacting the guide surfaces, and one side of the slide surface is provided with a stepped part depressed inwardly in the circumferential direction of the recliner.

9. The recliner of claim 8, wherein the stepped part is formed on the second lock gear.

10. The recliner of claim 8, wherein the stepped part includes an inclined surface formed to be inclined inwardly in the circumferential direction of the recliner from one side of the slide surface and a stepped surface extending in one direction from the one side of the inclined surface.

11. The recliner of claim 1, wherein a lock protruding surface provided at one end of the lock protrusion surface-contacts with a wedge groove surface provided at one end of the wedge groove.

12. The recliner of claim 11, wherein the second lock gear is formed to be bilaterally symmetric based on a first reference line S1 which connects an inner peripheral edge of the upper gear to the central axis of the recliner, the lock protruding surface is configured to have a predetermined inclination angle to a second reference line orthogonal to the first reference line, and the wedge groove surface is configured to have a predetermined inclination angle to the second reference line to correspond to the lock protruding surface.

13. The recliner of claim 12, wherein the lock protruding surface and the wedge groove surface are formed to be inclined toward an outside of the recliner.

14. The recliner of claim 1, wherein the holder has an upper surface protrudedly provided upwardly with a guide part of which guide surfaces are formed at both sides in a circumferential direction of the recliner so as to guide the linear reciprocating motion of the lock gear parts, the upper surface of the guide part is provided with a cylindrical holder protrusion protruding upwardly, and the upper gear is further provided with a rotating guide part depressed upwardly from a lower surface of the upper gear to have an inner peripheral edge contacting an outer peripheral edge of the holder protrusion.

15. The recliner of claim 14, wherein the holder protrusion includes a plurality of holder protrusions.

16. The recliner of claim 15, wherein the plurality of holder protrusions are each disposed at an equal interval along the circumferential direction of the recliner.

17. The recliner of claim 15, wherein the plurality of holder protrusions are each disposed at an equal distance from a rotating central axis of the recliner.

* * * * *